United States Patent
Wong et al.

(10) Patent No.: US 9,632,843 B1
(45) Date of Patent: Apr. 25, 2017

(54) MEMORY ALLOCATION FOR RAID SYSTEMS

(71) Applicant: Microsemi Storage Solutions (U.S.), Inc., Aliso Viejo, CA (US)

(72) Inventors: Jesslly Wong, Vancouver (CA); Raymond Lam, Vancouver (CA); Tao Zhong, Coquitlam (CA)

(73) Assignee: Microsemi Storage Solutions (U.S.), Inc., Aliso Viejo, CA (US)

( * ) Notice: Subject to any disclaimer, the term of this patent is extended or adjusted under 35 U.S.C. 154(b) by 0 days.

(21) Appl. No.: 14/691,011

(22) Filed: Apr. 20, 2015

(51) Int. Cl.
G06F 9/52 (2006.01)
G06F 3/06 (2006.01)
G06F 12/14 (2006.01)

(52) U.S. Cl.
CPC .......... G06F 9/524 (2013.01); G06F 3/0619 (2013.01); G06F 3/0665 (2013.01); G06F 3/0689 (2013.01); G06F 12/1475 (2013.01)

(58) Field of Classification Search
CPC ...... G06F 9/524; G06F 3/0619; G06F 3/0665; G06F 3/0689; G06F 12/1475
See application file for complete search history.

(56) References Cited

U.S. PATENT DOCUMENTS

| | | | |
|---|---|---|---|
| 6,651,124 B1 | 11/2003 | McAllister | |
| 2014/0040220 A1* | 2/2014 | Kimura | G06F 17/30008 707/704 |
| 2014/0164715 A1* | 6/2014 | Weiner | G06F 3/0659 711/143 |

* cited by examiner

*Primary Examiner* — Eric S Cardwell
(74) *Attorney, Agent, or Firm* — Dennis R. Haszko

(57) ABSTRACT

A method and system for allocating memory in a RAID system. A RAID system requires the use of shared memory to store processed data related to operations of different mass storage devices. Certain RAID algorithms require different sizes of memory regions of the memory, and multiple requests to lock the required memory regions are therefore required. As multiple requests are made in parallel for different operations, the multiple requests for each operation are sorted in a predetermined order. This ensures that all memory regions for one operation can be locked. Requests for memory regions locked by a second operation are held in a pending state to wait for release of those memory regions by a first operation, at which point they are locked again by the second operation.

18 Claims, 8 Drawing Sheets

MEMORY ALLOCATION FOR RAID SYSTEMS

FIELD

The present disclosure relates generally to managing memory allocation in storage systems. More particularly, the present disclosure relates to memory allocation in controller devices in storage systems.

BACKGROUND

In computing, specifically computer storage, a redundant array of independent (or inexpensive) drives (or disks) (RAID) is an umbrella term for data storage schemes that divide and/or replicate data among multiple hard drives. They offer, depending on the scheme, increased data reliability and/or throughput.

A RAID controller is often used to manage the data going to different drives for the purpose of data redundancy and performance improvement. During an operation where data is read from or written to the RAID, a RAID controller uses semiconductor memory, such as double data rate (DDR) memory by example, for a working area to temporarily store the read data or data that is going to be written. This memory can also temporarily store arithmetics, such as parity and other error correction data by example, before the final result can be used to write to the hard drives. Such operations require the RAID controller to manage data across all devices in the RAID set simultaneously. For example, a RAID controller with 8 ports/PHYs may control up to 8 devices, which requires 8 different sets of DDR memory regions to be managed. Commonly owned U.S. Pat. No. 7,743,191 discloses details of an example RAID controller, the contents of which are incorporated by reference.

RAID controllers require access to semiconductor memory during the course of operation, and requests are made for different regions of the memory. Because the RAID controller manages many different mass storage devices and the memory is limited, there are situations where two or more requests for the same memory regions are deadlocked. A deadlock situation is one where neither request can ever be completed, for example because each request has reserved regions of the memory the other request also requires.

It is, therefore, desirable to provide a memory arbitration method of operating a RAID controller that prevents deadlock situations in requests for memory from occurring.

SUMMARY

It is an object of the present disclosure to obviate or mitigate at least one disadvantage of previous RAID controllers.

In a first aspect, the present disclosure provides a method for allocating memory in a RAID controller. The method includes receiving memory region numbers, each memory region number corresponding to an address range of a memory; generating lock requests for locking memory regions of the memory in an order, each lock request including at least one of the memory region numbers; sorting the lock requests in a predetermined order; adding the lock requests in the predetermined order onto a request stack; and processing the lock requests in the order received by request stack to allocate memory corresponding to the memory region numbers of the lock requests. According to a present embodiment, receiving, generating, sorting and adding are independently executed by at least two processors of the RAID controller, where each of said at least two processors is associated with a PHY of the RAID controller. In this embodiment, processing includes granting the memory regions of a lock request when the memory regions of the memory are available, or denying granting the memory regions of the lock request when the memory regions of the memory are locked. In this embodiment, a denied lock request remains pending until the memory regions of the memory are released. According to an aspect of this embodiment, adding is executed by each of said at least two processors independently of each other.

In a further embodiment of this first aspect, the predetermined order is from lowest memory region number to highest memory region number, or from highest memory region number to lowest memory region number. In yet another embodiment of the first aspect, each lock request includes a pair of sequential memory region numbers.

In a second aspect, the present disclosure provides a RAID controller for allocating memory regions of a memory. The RAID controller includes multiple processors and a lock request processing engine. Each of the multiple processors is configured to generate lock requests for specific memory regions in response to a host device request for memory, and configured to provide the lock requests in a predetermined order. The lock request processing engine processes each of the lock requests for granting memory regions of the memory when the memory regions are available, and denies granting the memory regions when the memory regions of are already locked in response to a previous lock request. According to an embodiment, the RAID controller further includes a lock request stack for receiving the lock requests from the multiple processors and for providing the lock requests to the lock request processing engine. In another embodiment, the lock request stack functions as a first-in-first-out queue.

In another embodiment of the second aspect, the host device request includes a Super Descriptor Sequence (SDS) and each processor includes a hash engine for hashing a code of the SDS into a memory region number, where each memory region number corresponds to one of the specific memory regions of the memory. In this embodiment, each processor includes a lock request generator configured to generate a lock request including at least one memory region number. Furthermore for this embodiment, each processor includes a memory request sorter for reordering the lock requests generated by the lock request generator into the predetermined order. By example, the predetermined order is from lowest to highest memory region number.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

The present disclosure provides a method and system for allocating memory in a RAID system. A RAID system requires the use of shared memory to store processed data related to operations of different mass storage devices. Certain RAID algorithms require different sizes of memory regions of the memory, and multiple requests to lock the required memory regions are therefore required. As multiple requests are made in parallel for different operations, the multiple requests for each operation are sorted in a predetermined order. This ensures that all memory regions for one operation can be locked. Requests for memory regions locked by a second operation are held in a pending state to wait for release of those memory regions by a first operation, at which point they are locked again by the second operation.

Figure 1B:
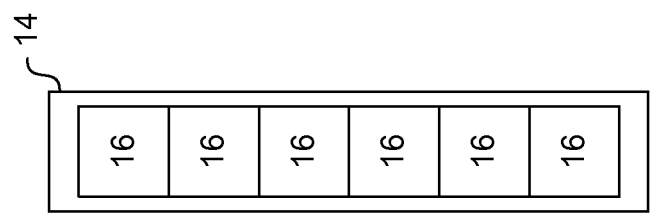
FIG. 1B is a graphical representation of a memory having logical memory regions.
Figure 1A:
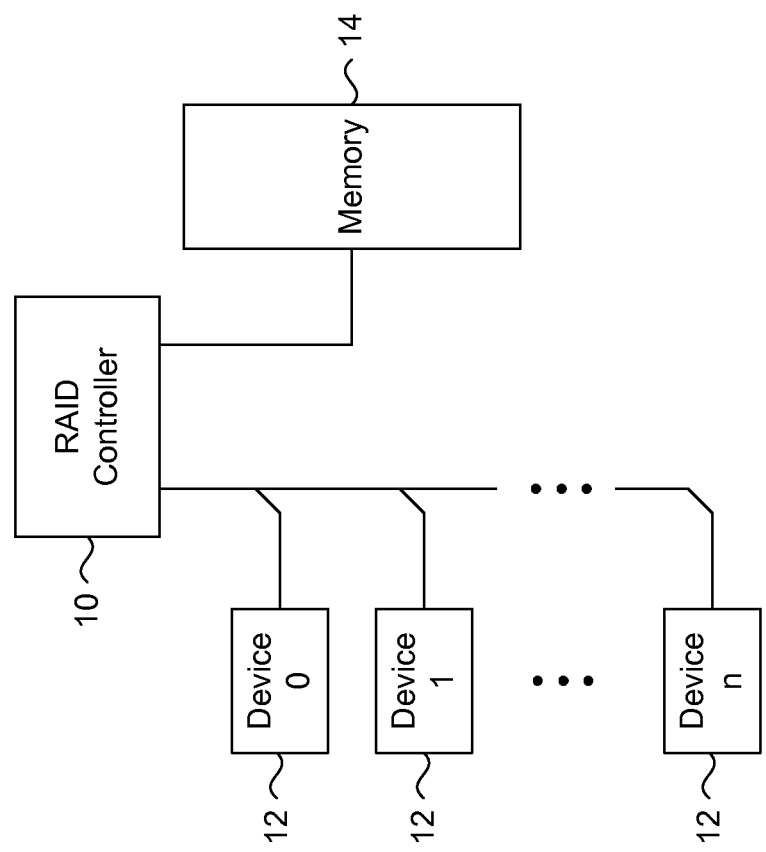
FIG. 1A is a block diagram illustrating a RAID system of the prior art.

FIG. 1A is a block diagram illustrating the general arrangement of a RAID system, which includes a RAID controller 10, mass storage devices 12, and a semiconductor memory 14. It is noted that there may be other components necessary for proper operation of the RAID system, but these are not shown in order to simplify the drawing. In FIG. 1A up to "n" mass storage devices 12, such as hard disk drives for example, are connected to RAID controller 10. The RAID controller 10 receives instructions from a host system (not shown) to execute operations to read from or write data to, the mass storage devices 12. In the presently shown example, there can be "n" mass storage devices 12, and the memory 14 can be any type of semiconductor memory, such as DDR DRAM memory. While RAID controller 10 can be configured to have one PHY per mass storage device 12, multiplexing schemes can be used to increase the number of mass storage devices 12 that share one PHY.

FIG. 1B is a simplified diagram of memory 14, showing individual memory regions 16. Depending on the size of memory 14, there can be any number of memory regions 16, each having the same size. By example, each memory region can be 1K in size to store up to 1K of data. Other circuits of the memory 14 are not shown, but are understood as being required to enable proper operation of the memory 14.

In order optimize memory size and efficiency, the memory 14 is shared for all operations for all the devices. This means that different memory regions must be temporarily reserved and released to allow other processes to share the finite memory space. Thus memory allocation management is necessary to avoid contention when requests for the same memory regions are received.

Figure 2:
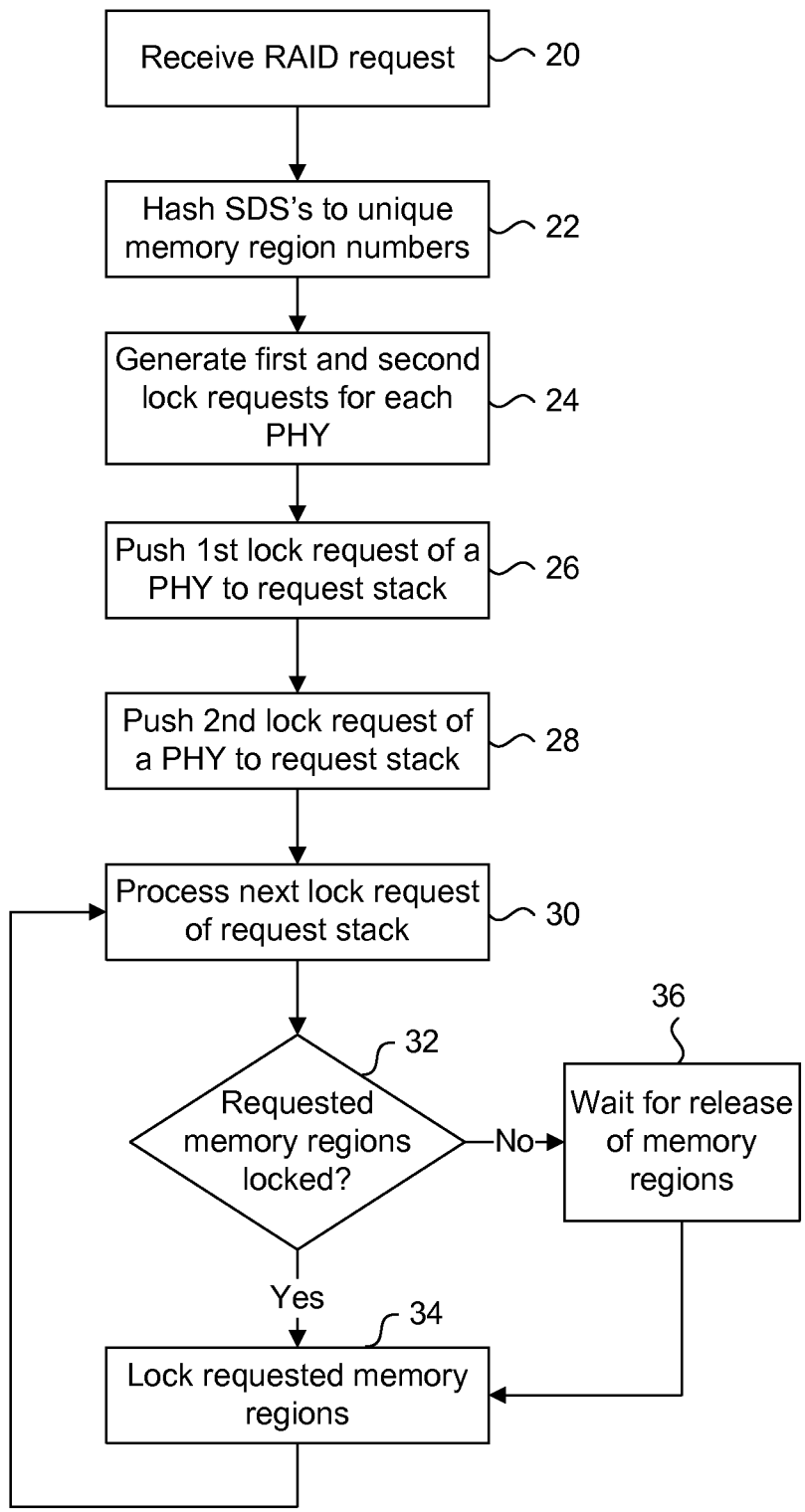
FIG. 2 is a flow chart of a memory allocation arbitration scheme for RAID systems.
Figure 3A:
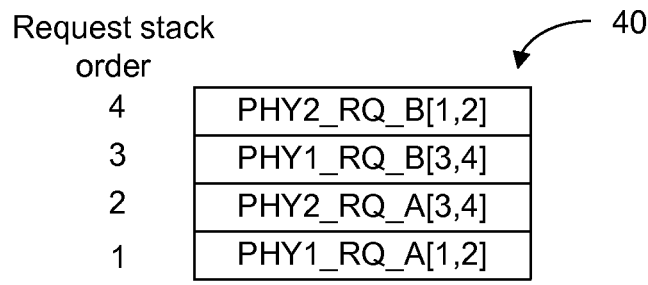
FIG. 3A is a graphical illustration of a request stack.
Figure 3B:
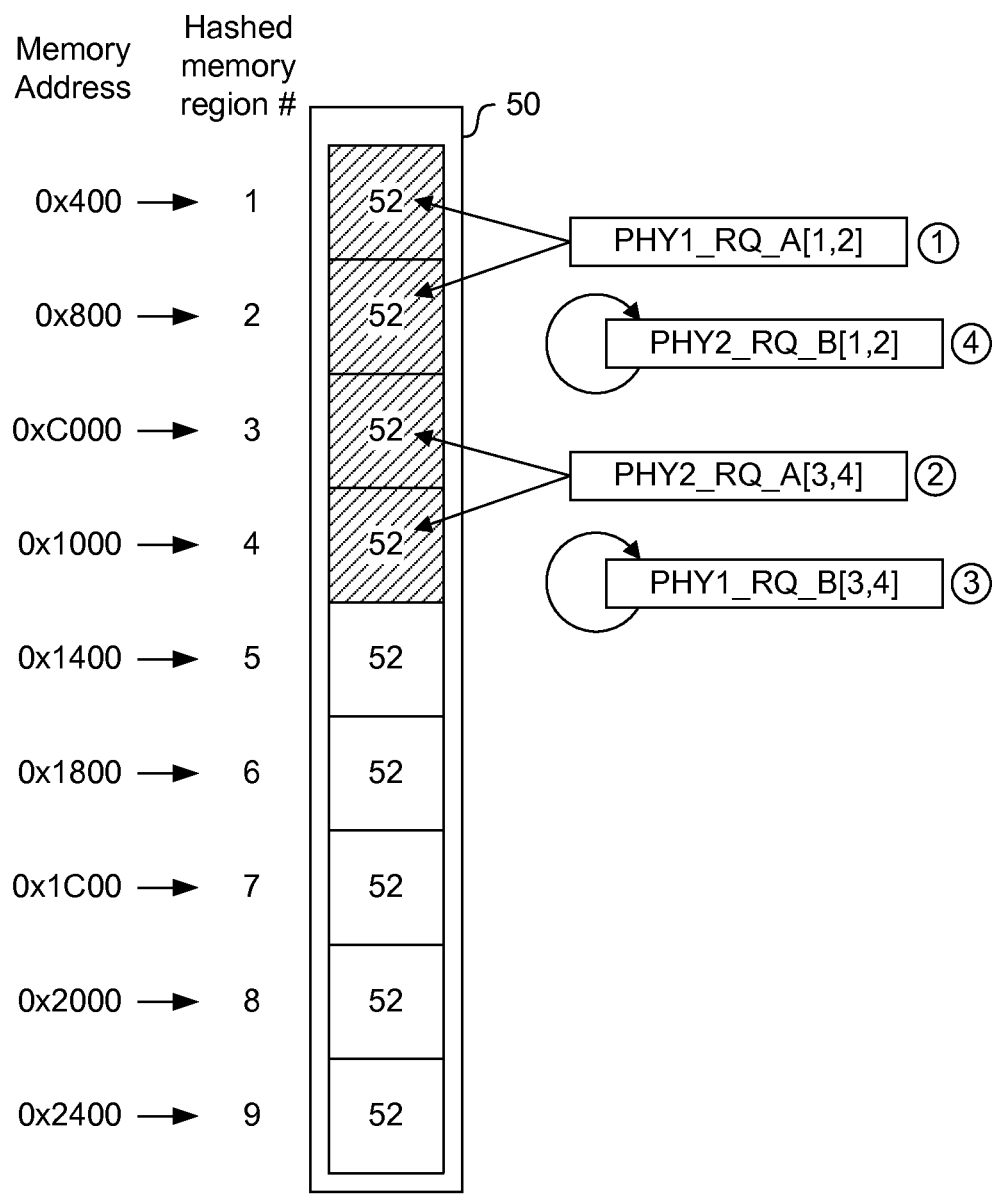
FIG. 3B is a graphical representation of memory regions being locked.

One memory allocation arbitration scheme is shown in the examples of FIG. 2. FIG. 2 is a flow chart showing a known memory allocation arbitration scheme for RAID systems, such as the RAID system shown in FIG. 1. FIG. 3B graphically depicts memory regions of a memory, such as memory 14 of FIG. 1, and an example allocation of the memory regions leading to a contention situation that cannot be resolved which is discussed later. The presently shown example operates in a RAID 6 algorithm where 4K of memory must be locked for each PHY. If the memory is logically divided into 1K memory regions, then two pairs of 2 consecutive or adjacent memory regions of the memory must be locked for that PHY.

The method starts at 20 where a RAID request is received, which includes messages or instructions. The RAID requests are received by an HSST processor in the RAID controller for executing operations for different PHY's, where one HSST processor serves one PHY and the RAID controller can include many HSST processors, where the HSST of the present embodiment generates a super descriptor sequence (SDS) from the request. A detailed description of SDS and HSST functionality is provided in commonly owned U.S. Pat. No. 8,762,609, which is incorporated by reference. If an SDS code is 64 bits in length, the SDS is hashed down to a smaller integer value at 22, which corresponds to a unique memory region of the memory. For example, if the memory is logically divided into 9 memory regions, then an SDS code is hashed to provide an integer number between 1 and 9. These numbers are generally referred to as memory region numbers. Alternately, a hashed SDS number can be mapped to one or more adjacent memory regions. FIG. 3B shows an example memory logically subdivided into 9 memory regions, each mapped to a corresponding memory region number. This particular hashing algorithm can easily be configured by persons of skill in the art.

In the present example, an SDS engine of the RAID controller can grant up to 2K of memory per lock request, or two 1K memory regions at a time. Therefore two lock requests are needed to lock four 1K memory regions in order to lock total 4K of memory. Returning to FIG. 2, the memory region numbers are bundled into lock requests at 24 for each PHY. More specifically, the RAID controller bundles a first lock request to include a first pair of memory region numbers and a second lock request to include a second pair of memory region numbers. By example, the first lock request can include memory region numbers 1 and 2, and the second lock request can include memory region numbers 3 and 4. The processes of 20, 22 and 24 can be executed for multiple PHY operations at substantially the same time.

Once the lock requests for a PHY operation has been bundled, the first lock request for the PHY operation is pushed onto a lock request stack or queue at 26, followed by the second lock request for the PHY operation at 28. The same process occurs for other PHY's independently of each other. An example stack is shown in FIG. 3A. The assignment of first and second lock requests is arbitrarily done. This queue can be implemented as a first-in-first-out (FIFO) register. The SDS engine then processes the next lock request of the lock request stack at 30, and at 32 checks if the memory region numbers in the lock request are currently locked from a previous lock request. If not, then the memory region numbers are locked at 34 and the required PHY operation proceeds. While not shown, once the PHY operation using the locked memory region numbers is complete, the SDS engine releases the memory region numbers for re-use. Accordingly, if at 32 the requested memory region numbers have not been released, a contention situation is present. In this situation, the SDS engine waits at 36 until they are released before re-locking them for the pending lock request for the same memory region numbers. Processes 30, 32, 34 and 36 repeat for the next lock request in the lock request stack, and so forth.

Unfortunately, there are situations where this type of memory allocation arbitration scheme can fail due to the order in which the lock requests are received and subsequently processed. It is assumed for the present example that a first PHY lock request (PHY1) and a second PHY lock request (PHY2) are received one after the other. PHY1 has a first lock request for memory region numbers 1 and 2, and a second lock request for memory region numbers 3 and 4. PHY2 has a first lock request for memory region numbers 3 and 4, and a second lock request for memory region numbers 1 and 2. The lock requests are pushed onto the request stack based on when they are generated by the respective HSST processors of the RAID controller, and have the ordering shown in FIG. 3A. In FIG. 3A, the request stack 40 receives new lock requests from the top and the next lock request to be processed is taken from the bottom. Therefore, the first lock request to be processed is "PHY1_RQ_A[1,2]", where "PHY1" designates the particular PHY the lock request belongs to, "RQ_A" indicates this is the first lock request for PHY1, and "[1,2]" indicates the memory region numbers being requested. The hashed memory region numbers and the ordering thereof results from the previously described processes 20, 22 and 24 operating on the bit pattern of the received SDS.

FIG. 3B shows a memory 50 having individual memory regions 52. Each memory region 52 is mapped to a corresponding hashed memory region number, which in the present example are memory regions 1 to 9. Other circuits of the memory 50 are not shown, but are understood as being required to enable proper operation of the memory.

It is assumed in the present example that all the memory regions 52 of memory 50 are presently available, or unlocked. The sequence of memory lock operations are designated by circled numbers. After processing the "PHY1_RQ_A[1,2]" lock request, memory regions 1 and 2 are locked as shown by the hatched lines of the memory regions 52 in FIG. 3B. Next, after processing the "PHY2_RQ_A[3,4]" lock request, memory regions 3 and 4 are locked as shown by the hatched lines of the memory regions 52. Now the lock request "PHY1_RQ_B[3,4]" is processed, but memory regions 3 and 4 are currently locked. Therefore the RAID system will wait for PHY2 to release memory regions 3 and 4. Proceeding to the lock request "PHY2_RQ_B[1,2]", memory regions 1 and 2 are currently locked by PHY1, and the RAID system will wait for PHY1 to release memory regions 1 and 2. It is clear that neither PHY1 or PHY2 can release their locked memory regions, as neither can complete their operations. This can be referred to as a deadlock situation. As a result, performance of the RAID system is negatively impacted.

Figure 4A:
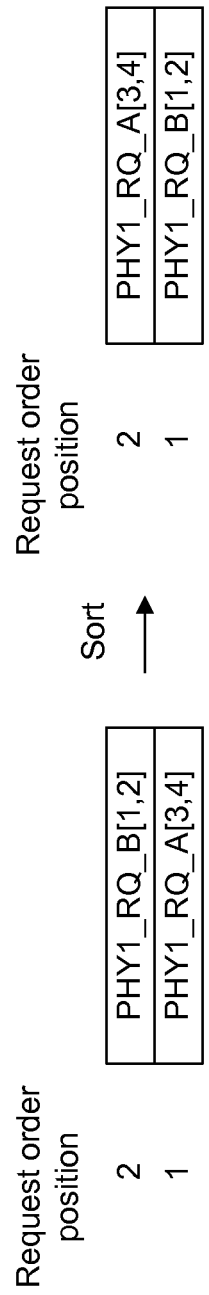
FIGS. 4A and 4B are example lock request sorting schemes, according present embodiments.
Figure 4B:
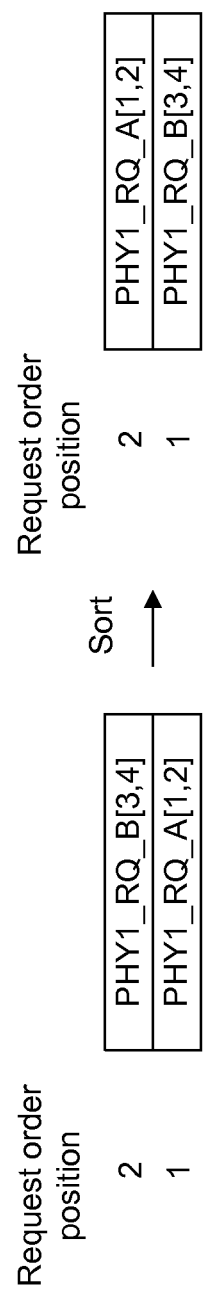

FIGS. 4A and 4B illustrate examples of two possible sorting schemes for 2 lock requests of a PHY. The left side of FIG. 4A shows the original generated first lock request A and second lock request B for PHY1, and the arbitrarily assigned order positions 1 and 2 indicating the sequence of memory lock operations. The first lock request PHY1_RQ_A[3,4] will request memory regions 3 and 4 and the second lock request PHY1_RQ_B[1,2] will request memory regions 1 and 2. If the sort scheme is based on ascending order of memory region numbers, then the resulting sorted lock requests are as shown on the right side of FIG. 4A where the order of the original first and second requests have been swapped. Now original lock request "B" would be processed first, followed by original lock request "A". FIG. 4B shows an alternate sort scheme based on descending order of memory region numbers. The left side of FIG. 4B shows the original first generated lock request A and second generated lock request B for PHY1, and the arbitrarily assigned order positions 1 and 2 indicating the sequence of memory lock operations. The first lock request PHY1_RQ_A[1,2] will request memory regions 1 and 2 and the second lock request PHY1_RQ_B[3,4] will request memory regions 3 and 4. The resulting sorted lock requests are as shown on the right side of FIG. 4B where the positions of the original first and second requests have been swapped. Now original lock request "B" would be processed first, followed by original lock request "A". If the lock requests happen to be generated in the desired ordering scheme, then the sorting proceeds with no changes being made to the ordering of the lock requests.

The presently described embodiments can be used in applications where multiple operations occur asynchronously, and each operation temporarily reserves memory regions of a memory in at least two memory locking cycles. Each locking cycle processes one lock request in the present embodiments, but could process multiple lock requests in alternate embodiments. When the operation is completed the reserved memory regions are released for reservation and use by another lock request.

Figure 5:
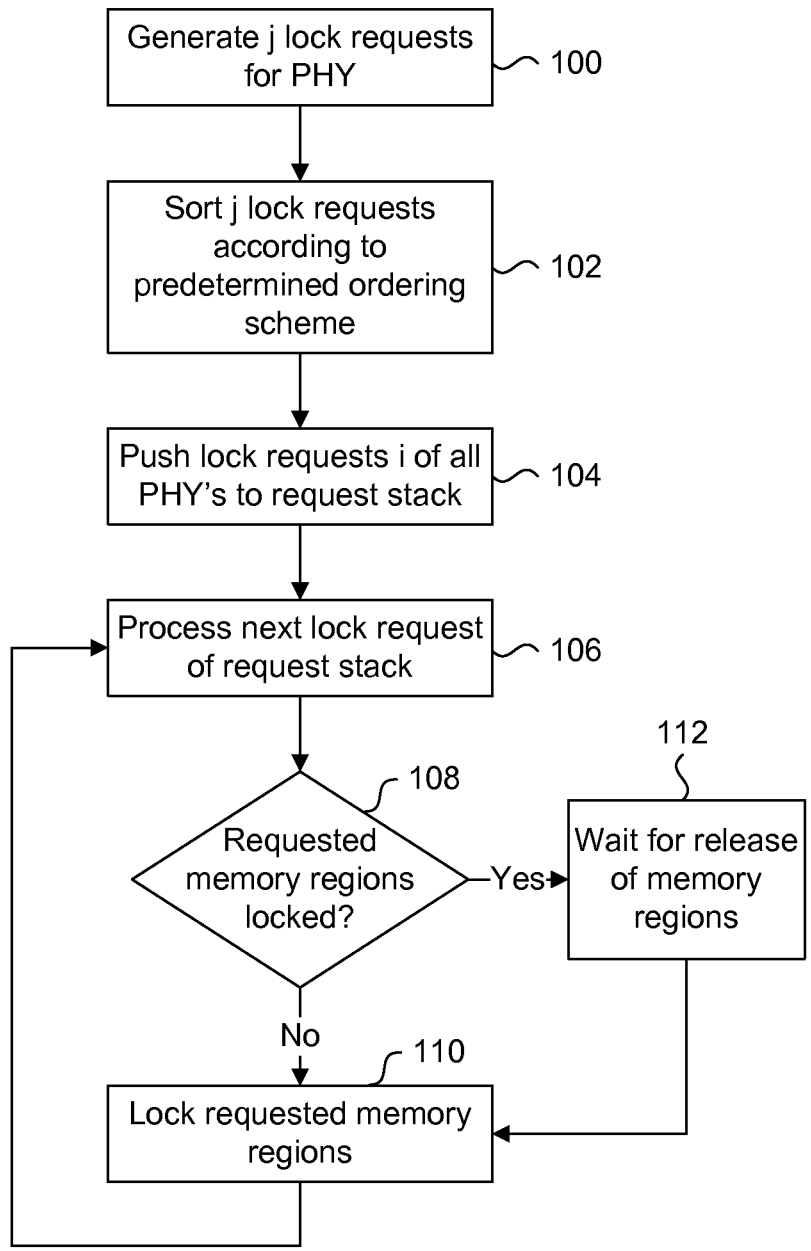
FIG. 5 is a flow chart of a method for allocating memory for a RAID system, according to a present embodiment.

FIG. 5 is a flow chart of a method for allocating memory in a RAID system, according to a present embodiment, and in particular a RAID controller using the lock request sorting technique of the present embodiments. For the presently described method embodiment, it is assumed that a host device has already made a request for memory to one PHY. As will be discussed later for the embodiment of FIG. 7, a host device makes a request for memory to the RAID controller via an instruction or message, which can include one or more SDS descriptors. Starting at 100, a number (j) of lock requests for each PHY are generated using hashed memory region numbers. Depending on the specific RAID algorithm and the sizes of the memory regions, j can be any integer number of at least 2, where the j lock requests are ordered from a first lock request to a last (jth) lock request. Each lock request can include one or more of the hashed memory region numbers, which depends on the number of memory regions which can be processed at the same time by the RAID controller. The memory region numbers of a lock request can be referred to as a set of memory region numbers.

Proceeding to 102, the j lock requests are sorted according to a predetermined ordering scheme based on the memory region numbers of each lock request. For example, the ordering scheme can be in ascending memory region numbers from the first lock request to the jth lock request.

Any ordering scheme can be used in alternate embodiments, provided the same ordering scheme is applied to all PHY lock requests. Once the j lock requests are sorted, the lock requests are pushed onto a request stack in the new order, which executes a first-in-first-out queue function. As will be described in further detail later, each PHY operates independently of the other, and the steps 100, 102 and 104 are executed by all the PHY's. More specifically, each PHY will push its reordered first lock request to the request stack at 104, followed by its reordered second lock request and so forth, until the last reordered lock request has been added.

Once all the lock requests of the PHY's have been added to the request stack, processing of the lock requests starts at 106 with the next lock request in the request stack. A determination is made at 108 to check if the requested memory region numbers of the current lock request are currently locked or available. If the set of memory region numbers are available, then they are locked for the current lock request at 110 and the method returns to 106 to process the next lock request of the request stack. Otherwise, if the requested memory regions are currently locked by a previous PHY operation, then a wait state is entered at 112. According to the present embodiments, other lock requests can be processed while the current lock request is in the wait state 112. When the PHY operation locking the requested memory regions is completed, they are released and locked at 110 by the lock request pending at 112. The memory regions can be released in the same order they were locked, or in a different order.

Therefore, because all the lock requests are sorted before the lock requests are executed, the present memory allocation method avoids the deadlock situation where different commonly required memory regions are locked by other PHY operations, as shown in the example of FIG. 3B.

Figure 6A:
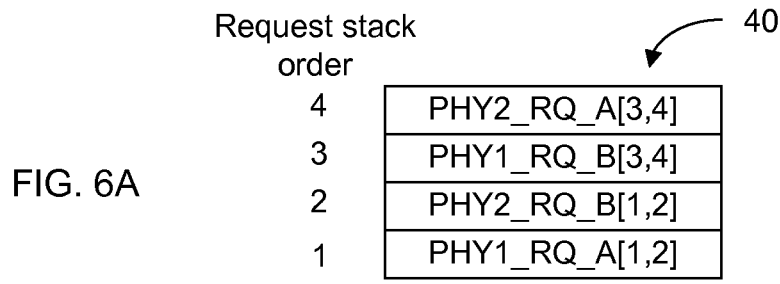
FIG. 6A is a graphical illustration of a request stack with sorted lock requests.
Figure 6B:
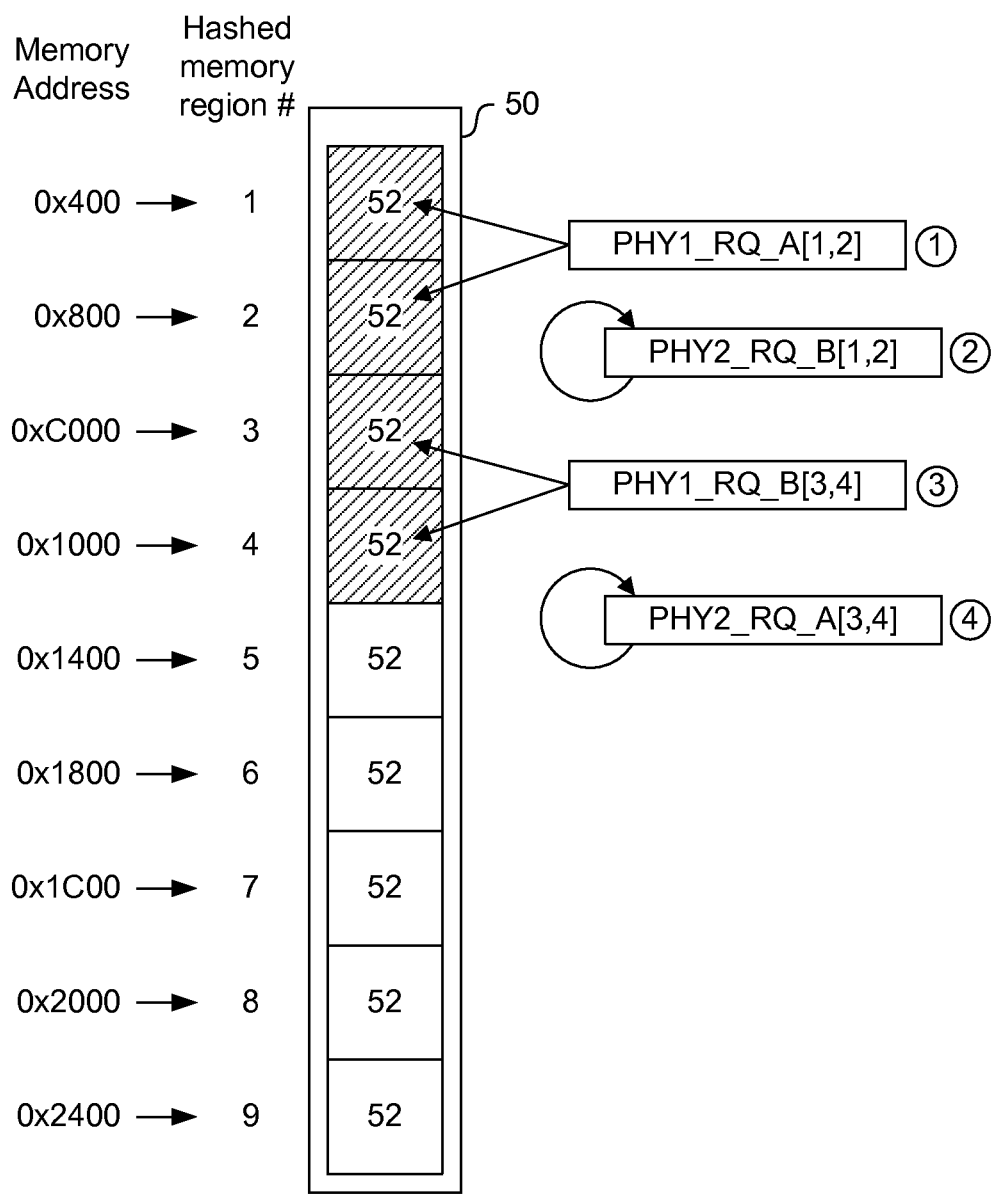
FIGS. 6B and 6C are graphical representations of memory regions being locked using sorted lock requests, according to a present embodiment; and, FIG. 7 is a block diagram of a RAID controller configured to allocate memory regions according to the present embodiments.
Figure 6C:
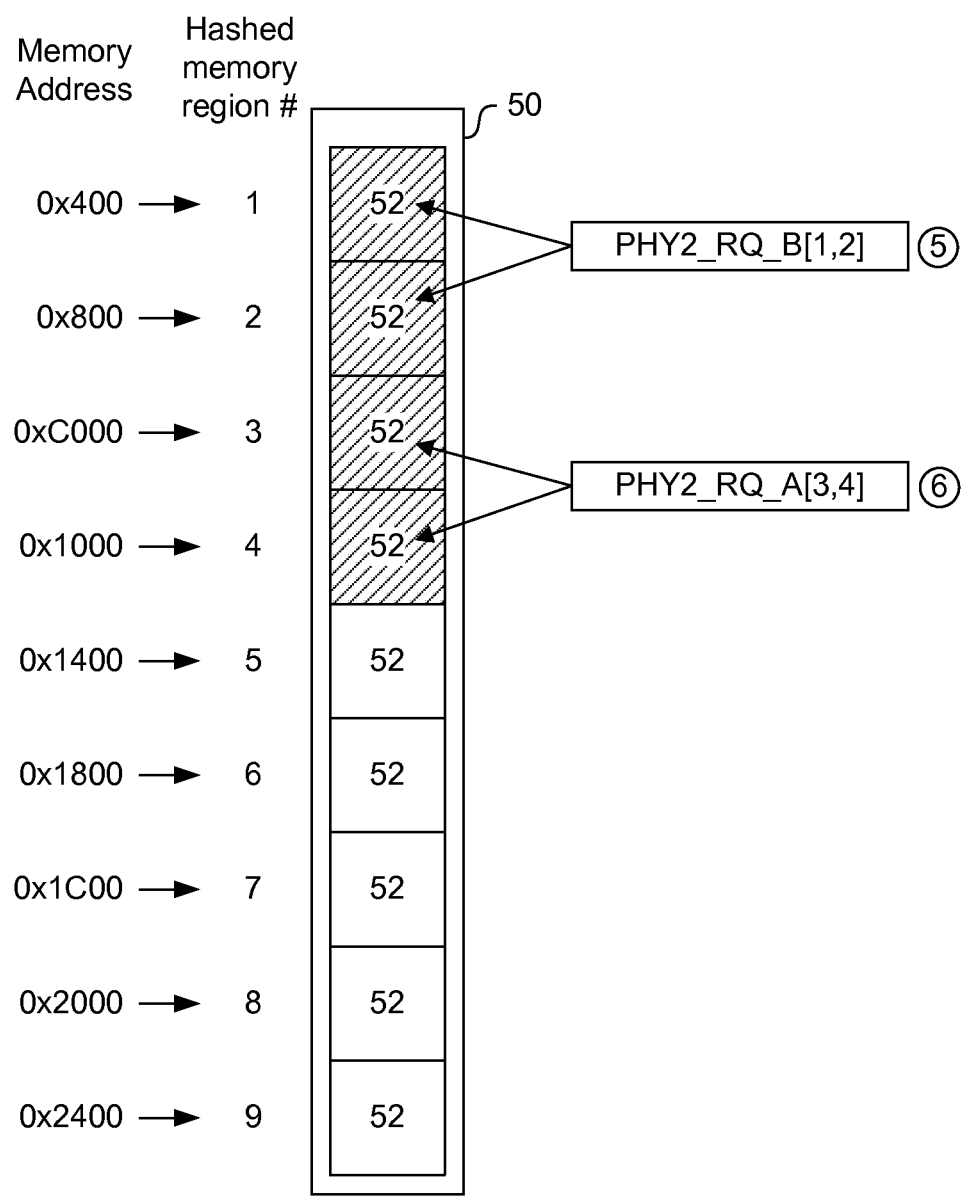

FIG. 6A shows an example request stack after lock requests for two PHY's are processed and sorted according to steps 100, 102 and 104 of the method embodiment of FIG. 5. It is assumed that the sorting of lock requests for PHY1 and PHY2 is ordered by ascending memory region numbers between a first lock request and a last lock request. The sort can compare the lowest memory region number of the lock request, if there are multiple memory region numbers per lock request. FIG. 6B illustrates locking of the memory regions 52 of memory 50 after the lock requests of PHY1 and PHY2 are sorted. It is assumed that all memory regions 52 are available. The lock request PHY1_RQ_A[1,2] is processed and memory regions 1 and 2 are locked. Next the lock request PHY2_RQ_B[1,2] is processed, but because memory regions 1 and 2 are currently locked, this lock request is then put into a waiting state. Next the lock request PHY1_RQ_B[3,4] is processed and memory regions 3 and 4 are locked. Now that both lock requests for PHY1 have resulted in locking of all requested memory regions, the PHY1 operation can proceed and use the requested memory regions 1, 2, 3 and 4. Next the lock request PHY2_RQ_A [3,4] is processed, but because memory regions 3 and 4 are currently locked, this second lock request is then put into a waiting state.

Once the PHY1 operation using memory regions 1, 2, 3 and 4 is completed, memory regions 1 and 2 are first unlocked in an unlock cycle. Now that memory regions 1 and 2 are unlocked, the pending PHY2_RQ_B[1,2] lock request then locks memory regions 1 and 2. Next, memory regions 3 and 4 are unlocked in another unlock cycle, and the pending PHY2_RQ_A[3,4] lock request then locks memory regions 3 and 4. Now that both lock requests for PHY2 have resulted in locking of all requested memory regions, the PHY2 operation can proceed and use the requested memory regions 1, 2, 3 and 4.

Figure 7:
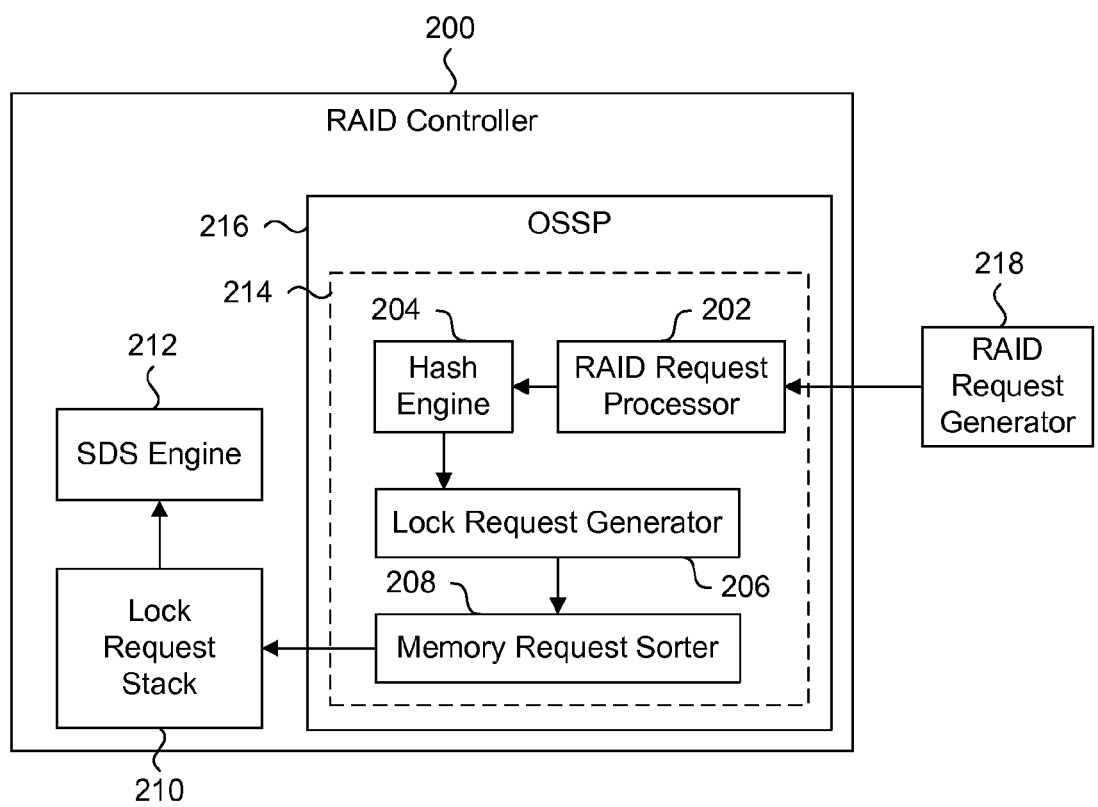

FIG. 7 is a block diagram of a RAID controller configured to sort lock requests of PHY's in a predetermined order and lock memory regions, according to a present embodiment. The RAID controller 200 includes a RAID request Processor 202, a hash engine 204, an SDS lock request generator 206, a memory request sorter 208, a lock request stack 210 and an SDS engine 212. Collectively, elements 202, 204, 206 and 208 are dedicated to a single PHY, and referred to as a Hardened SAS/SATA Transport Layer (HSST) processor 214 in the present embodiments. Therefore, there can be any number of HSST processors 214 in RAID controller 200. Each HSST processor 214 operates independently of the other HSST processors 214. In the present embodiment, the HSST processors 214 are part of an OSSP (Octal SAS/SATA Protocol) controller 216. Other components of RAID controller 200 are not shown in order to simply the schematic. Also shown in FIG. 7 is a RAID request generator 218, such as any host device.

Following is a brief description of the general functionality of the elements shown in FIG. 7.

The RAID request generator 218 issues requests for memory, in the form of an instruction or message (such as an SDS descriptor for example) that includes address information of where the data stored on a storage device (ie. hard disk drive) should be located. The message would also include a request for a specific amount of memory, such as for example 4K of memory in the RAID 6 operating configuration. The amount of memory being requested will depend on the specific RAID operating configuration.

The RAID request processor 202 receives the instruction from the RAID request generator 218, and fetches data from the storage device using the address information in the message. The RAID request processor 202 further generates a code for each 1K memory region that is being requested. In the present example of a RAID 6 configuration, four different codes are generated as 4K of memory is required. It is noted that while 4K of memory is required in the RAID 6 configuration, approximately 2K of actual data is stored. For the purposes of robustness, each 1K of actual data is allocated a 2K DDR memory space. Therefore, two 1K sequential memory regions are required for each 1K of actual data to be stored, and the corresponding codes are generated on this basis.

The hash engine 204 has information about the size of DDR memory, and logically divides the memory into regions each having a predetermined size and corresponding address range. Each memory region is then assigned an integer memory region number, as shown in the embodiment of FIG. 6B by example. In the previously shown examples, each memory region can be 1K in size. The hash engine 204 receives the codes generated by the RAID request processor 202, and hashes each to provide a hashed memory region number. For the RAID 6 configuration, four hashed memory region numbers are generated in pairs of adjacent memory regions. Each pair of adjacent memory regions can be located anywhere in the DDR memory, or both pairs can be adjacent to each other.

The lock request generator 206 receives the pairs of hashed memory region numbers from the hash engine 204 and generates lock requests. In the present embodiments, each lock request includes a pair of memory region numbers (corresponding to a pair of adjacent memory regions). For the RAID 6 configuration, first and second lock requests including different pairs of memory region numbers are generated, but in a random order. In the method embodiment of FIG. 5, the generation of j lock requests at 100 would be executed by lock request generator 206.

The memory request sorter 208 receives the first and second lock requests from the lock request generator 206, and executes a reordering according to the present embodiments. By example, reordering can be done by increasing memory region numbers. Therefore the lock request having the lowest memory region numbers is reordered to be the first lock request, and the lock request having the next lowest memory region numbers higher than those in the first lock request is reordered to be the second lock request, and so forth. Once reordered, the memory request sorter 206 issues the first lock request onto the lock request stack 210, followed by the second lock request. In the method embodiment of FIG. 5, the sorting of the j lock requests at 102 would be executed by memory request sorter 208.

The lock request stack 210 functions as a first-in-first-out queue, which receives lock requests from all the HSST processors 214. Accordingly, because the HSST processors 214 of the RAID controller 200 operate independently from one another, the lock request stack 210 can receive many lock requests for different PHY's at different times. Therefore the first and second lock requests from the various HSST processors 214 can be interleaved with each other on the lock request stack 210. In the method embodiment of FIG. 5, the request stack referred to in 104 would be the lock request stack 210.

The SDS engine 212 processes each lock request of the lock request stack 210 in the order that they were added. More specifically, SDS engine 212 checks if the requested memory regions specified in the lock request are available or not. If available, the memory regions are granted. If the requested memory regions are not available, because they were previously granted and still in use by another PHY, then the HSST processor 214 making that request is put into a wait state until the requested memory regions are released and become available. In the method embodiment of FIG. 5, processing of the lock requests at 110 would be executed by SDS engine 212.

The previously described embodiments generate lock requests with a default arbitrary order, which are then re-ordered. In an alternate embodiment, the lock request generator 206 can be configured to sort the pairs of memory region numbers before generation of the lock requests. Then the first lock request is generated to include the lowest memory region numbers, followed by generation of the second lock request with the next lowest memory region numbers, and so forth.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A method for arbitrating allocation of a memory in a RAID controller having a plurality of Physical Layer circuits (PHYs), the memory having a plurality of regions each identified by a memory region number, the method comprising:
    generating a first plurality of lock requests for a first PHY of the RAID controller, each of the lock requests of the first plurality of lock requests comprising at least one memory region number;
    generating a second plurality of lock requests for a second PHY of the RAID controller, each of the lock requests of the second plurality of lock requests comprising at least one memory region number;
    sorting each of the first and second plurality of lock requests in a predetermined order;
    adding the first plurality of lock requests and the second plurality of lock requests in the predetermined order onto a request stack such that the first plurality of lock requests and the second plurality of lock requests are in an at least partially interleaved order; and
    processing the first and second plurality of lock requests in the at least partially interleaved order to allocate memory corresponding to the memory region numbers of the lock requests.

2. The method of claim 1, wherein a first processor is associated with a first PHY of the plurality of PHYs and a second processor is associated with the second PHY of the plurality of PHYs, and each of the first and second processors independently:
    generates the respective plurality of lock requests;
    sorts the respective plurality of lock requests in the predetermined order; and
    adds the respective plurality of lock requests to the request stack in the at least partially interleaved order.

3. The method of claim 2, wherein processing includes granting the memory regions of the respective lock request when the memory regions of the memory are available.

4. The method of claim 3, wherein processing includes denying granting the memory regions of the respective lock request when the memory regions of the memory are locked.

5. The method of claim 4, wherein a denied lock request remains pending until the memory regions of the memory are released.

6. The method of claim 1, wherein the predetermined order is from lowest memory region number to highest memory region number.

7. The method of claim 1, wherein the predetermined order is from highest memory region number to lowest memory region number.

8. The method of claim 1, wherein each lock request includes a pair of sequential memory region numbers.

9. A RAID controller for arbitrating memory allocation, comprising:
    a plurality of Physical Layer circuits (PHYs);
    a memory comprising a plurality of memory regions each identified by a respective memory region number;
    a request stack for queueing lock requests;
    a plurality of processors each associated with a particular PHY of said plurality of PHYs, each said processor configured to:

generate a plurality of lock requests for the particular PHY associated with the processor, each of the lock requests comprising at least one memory region number;

sort the plurality of lock requests of the particular PHY associated with the processor in a predetermined order; and add the plurality of lock requests of the particular PHY associated with the processor onto the request stack in the predetermined order such that the lock requests of the particular PHY associated with the processor and the lock requests of another PHY associated with another processor are in an at least partially interleaved order; and, a lock request processing engine for processing the lock requests of each of the PHYs associated with the plurality of processors in the at least partially interleaved order to allocate the memory regions corresponding to the memory region numbers of the lock requests.

10. The RAID controller of claim 9, wherein the memory region numbers are derived from a Super Descriptor Sequence (SDS) and each processor includes a hash engine for hashing a code of the SDS into a memory region number.

11. The RAID controller of claim 10, wherein each processor includes a lock request generator configured to generate the plurality of lock requests.

12. The RAID controller of claim 11, wherein each processor includes a memory request sorter for sorting the plurality of lock requests generated by the lock request generator into the predetermined order.

13. The RAID controller of claim 12, wherein the predetermined order is from lowest memory region number to highest memory region number.

14. The RAID controller of claim 12, wherein the predetermined order is from highest memory region number to lowest memory region number.

15. The RAID controller of claim 12, wherein each lock request includes a pair of sequential memory region numbers.

16. The RAID controller of claim 9, wherein the lock request processing engine processes the lock requests by granting the lock requests when the memory regions corresponding to the memory region numbers of the lock requests are available.

17. The RAID controller of claim 9, wherein the lock request processing engine processes the lock requests by denying the lock requests when the memory regions corresponding to the memory region numbers of the lock requests are locked.

18. The RAID controller of claim 17, wherein the denied lock requests remain pending until the memory regions corresponding to the memory region numbers of the lock requests are released.

* * * * *